United States Patent [19]

Jackson-Wynch

[11] Patent Number: 5,727,845
[45] Date of Patent: Mar. 17, 1998

[54] ARMREST ARRANGEMENTS IN CONVERTIBLE AIRCRAFT PASSENGER SEATING

[75] Inventor: Anthony Thomas Jackson-Wynch, Chesham, England

[73] Assignee: Flight Equipment and Engineering Limited, Leighton Buzzard, England

[21] Appl. No.: 406,879

[22] PCT Filed: Jul. 28, 1994

[86] PCT No.: PCT/GB94/01633

§ 371 Date: Apr. 25, 1995

§ 102(e) Date: Apr. 25, 1995

[87] PCT Pub. No.: WO95/03969

PCT Pub. Date: Feb. 9, 1995

[30] Foreign Application Priority Data

Jul. 29, 1993 [GB] United Kingdom ............... 9315696

[51] Int. Cl.⁶ ............................................. A47C 15/00
[52] U.S. Cl. ...................... 297/257; 297/232; 244/118.6
[58] Field of Search ...................... 297/257, 118, 297/232, 236, 130, 249, 411.37; 244/118.6, 122 R; 296/65.1

[56] References Cited

U.S. PATENT DOCUMENTS 5,104,065  4/1992  Daharsh et al. ............... 244/118.6
5,284,379  2/1994  Arnold et al. ................. 297/257 X Primary Examiner—Laurie K. Cranmer
Attorney, Agent, or Firm—Watson Cole Stevens Davis, P.L.L.C.

[57] ABSTRACT

An aircraft passenger seating unit providing seats for two or more passengers abreast which is convertible to provide different widths of seats by moving seat parts laterally with respect to one another between two configurations, wherein the seats are defined by an end armrest (4, 5) at each side of the unit and by a pair of intermediate armrests (6, 7, 8, 9) between the or each pair of adjacent seats and lost-motion devices move the intermediate armrests apart when the unit is moved to the configuration providing wider seats and enable them to be moved together when the unit is moved to the configuration providing narrower seats. The lost-motion devices may be headed rods.

10 Claims, 4 Drawing Sheets

ARMREST ARRANGEMENTS IN CONVERTIBLE AIRCRAFT PASSENGER SEATING

TECHNICAL FIELD

Aircraft passenger seating is commonly constructed in units each comprising seats for two or more passengers abreast, mounted on a support frame having leg structure terminated by feet designed to engage releasably with a pair of parallel tracks secured in the aircraft cabin floor and extending longitudinally thereof.

BACKGROUND ART

Because some passengers are willing to pay more than others for travel on the same journeys, aircraft operators have developed fare structures which provide different fares for passengers occupying seats which provide different degree of comfort. In particular the seats have different widths and usually different lateral pitches. Because the proportion of passengers who wish to travel on the different fares on any one flight cannot usually be predicted long in advance there have been developed over a number of years convertible seating units which which can be manipulated to vary the width and frequently also the number of the seats provided in a unit. For example, in U.S. Pat. No. 4,533,175 a unit is described which provides either three narrow seats abreast, separated by two armrests or two wider seats abreast, separated by a single wider armrest formed from a part of the backrest which previously served the middle seat, the said two armrests being folded down to an inoperative position to make way for the wider armrest. In a unit described in European Patent Specification No. 0 385 861 B1 which likewise provides either three narrow seats or two wider seats there are two intermediate armrests between the two outer seats, mounted on pantograph-type linkages enabling them to be moved laterally between first positions in which they will support a loose table between two wider seats and second positions spaced more widely apart in which they define a third seat between two narrower seats.

More recently there have been developed convertible seating units providing two or more seats abreast in which certain seats or parts of seats are laterally movable with respect to others so that the lateral pitch or spacing between them and/or their widths can be changed. Usually there is some locking means for fixing the laterally movable seats or parts releasably in different positions. Typically there are two such positions, one providing narrow seats, usually with narrow lateral spacing between them, for example for "Tourist Class" passengers, and one with wider seats, usually with wider lateral spacing, for example for "Business Class" passengers. Examples of such units are described and illustrated in U.S. Pat. Nos. 3,893,729, 4,881,702, 5,104,065, 5,131,607 and 5,178,345 and in European Patent Application No. 0 530 900 A1.

In British Patent Specification No. 2 249 721 A (WO 90/11930) a convertible seating unit is described which provides either narrow seats abreast, separated by two armrests (called "arm dividers") in a first fixed position or two wider seats abreast, separated by the same two armrests which have been moved closer together to a second fixed position and by a backrest part of the middle seat of the three, which has been folded down to co-operate with the armrests to form a tray for use by occupants of the two seats. In one embodiment each outer seat has a seat back comprising a central frame and interengagable shell sections which are laterally slidable and co-operate with alternative removable pieces of foam padding of two different widths which are used selectively to provide either narrow seat backs for the three-seat configuration or wider seat backs for the two-seat configuration. In another embodiment the side seat backs are laterally movable on the frame of the unit.

In U.S. Pat. No. 5,131,607 a seating unit providing three seats abreast is described which is convertible between configurations providing three narrower seats and three wider seats. The three seats are constructed on three separate frame parts, the first and second of which are laterally movable relative to each other and to the third to enable the unit to be converted between the two configurations. The third frame part is fixed to the remainder of the frame and intended to be positioned adjacent to the sidewall or window of an aircraft cabin. The first and second frame parts and the second and third frame parts respectively are connected together by what will be termed "lost-motion devices" which permit a degree of relative movement between two components followed by movement of both components together or, in the case in which one component is fixed, by the fixing of both components. In the embodiment illustrated in the drawings accompanying U.S. Pat. No. 5,131,607 the lost-motion devices connecting the frame parts together are rods. A first rod is secured by one end to the third frame part, passes through a bore on the second frame part and extends a distance beyond the end of the bore equal to the desired travel of the second frame part relative to the third. At its free end it carries a stop member which will not pass through the bore, for example a nut, a circlip or an enlarged head. A second rod secured by one end to the first frame part, which will be adjacent to an aisle when the unit is in position on an aircraft, similarly connects it to the second frame part. The unit is converted from the narrower configuration to the wider configuration simply by releasing a lock mechanism and pulling the first frame part towards the aisle. The first frame initially moves away from the second frame part until the stop member contacts a wall of the second frame part surrounding the bore through which the rod passes. On further moving the first frame part the stop member moves the second frame part with it, away from the third frame part. The second frame part slides along the first rod until the stop member contacts a wall of the second frame part around the bore through which the rod passes. That contact halts the movement of the second frame part and defines the wider configuration of the unit. The length of the rods determine the relative positions of the frame parts in that configuration and there is a locking device to lock them releasably in those positions.

Conversion back to the narrower configuration is simply a matter of pushing the first frame part inwardly towards the second and third after releasing the locking device. The first frame part will approach the second, the second rod sliding through the bore in the second frame part until the two frame parts make contact, whereupon further inward movement of the first frame part will push the second frame part inwardly towards the third. The first rod will slide through the bore in the second frame part until the second and third frame parts make contact. The narrower configuration has then been regained.

End armrests are secured to the first and third frame parts and intermediate armrests are mounted between the first and second frame parts and the second and third frame parts. The end armrest secured to the first frame part moves laterally with it during conversion of the unit between the two configurations. The intermediate armrests are mounted on upward extensions of the rear ends of the side members of the second frame part and they are engaged respectively by lost-motion devices mounted on the first and third frame parts. These lost-motion devices comprise rods extending laterally from the said respective frame parts which pass through bores in the intermediate armrest mountings and some distance beyond the ends of the bores and are terminated by stop members such as nuts which will not pass through the bores. During conversion of the unit from the narrower configuration to the wider, as the first seat frame part moves laterally away from the second, the rod slides in the bore in the mounting of the intermediate armrest between the first and second frame parts until its stop member abuts against the wall surrounding the bore. Thereafter the intermediate armrest moves with the first frame part, away from the second frame part until the latter begins to move as described above. That beginning movement slides the bore in the second intermediate armrest mounting along the rod which is secured to the third frame part until its stop member in turn abuts against the wall surrounding the bore. Then the second intermediate armrest is moved laterally away from the third frame part until the lateral movements are completed as described above.

The lengths of the rods which move the intermediate armrests are adjusted so that when conversion to the wider configuration is complete the intermediate armrests are located so that the widths of the three seats defined between the end and intermediate armrests are adjusted more or less equally. However, as the end armrests are fixed in relation to the first and third frame parts, the two side seats are each adjusted only on one side whereas the middle seat is adjusted at both sides. Therefore whilst the backrest of the middle seat is located centrally between the intermediate armrests in both the narrower and wider configurations and the seat always appears symmetrical, the backrest of a side seat, if located centrally between the end and intermediate armrests which define the seat in one configuration, will be off-centre in the other configuration, giving a non-symmetrical appearance and maybe less than maximum comfort to a passenger occupying the seat. Furthermore, because the object of the narrower configuration is to accommodate more passengers in the available space, the intermediate armrests in convertible seating units are usually made as narrow as is possible compatible with providing adequate separation of adjacent seats and a moderate degree of comfort in the narrower configuration of the unit. On the other hand the wider configuration is intended to provide greater comfort for fewer passengers paying a higher fare, so the narrow intermediate armrests are not then entirely appropriate. Furthermore, whilst sharing a single armrest might be acceptable to passengers paying a lower fare scale, it is likely to be unacceptable to passengers paying a higher fare for wider seats or wider spaced seats.

In all the prior proposals for convertible seating which have been described and in all others known to the Applicants there is only one armrest between adjacent seats is at least one configuration of the unit.

DISCLOSURE OF THE INVENTION

According to this invention an aircraft passenger seating unit providing seats for two or more passengers abreast which is convertible to provide different widths of seats by moving seat parts laterally with respect to one another between two configurations, in which the seats are defined by an end armrest at each end of the unit and intermediate armrests between the or each pair of adjacent seats, is characterized in that there is a pair of intermediate armrests between the or each pair of adjacent seats and in that the end armrests and one of the or each pair of intermediate armrests are each connected to the adjacent seat part by a lost-motion device, the said lost-motion devices permitting, when the seating unit is being converted between the two configurations, limited relative lateral movement between each of the said armrests and the said adjacent seat part and the intermediate armrests of the or each said pair are connected to each other by another lost-motion device permitting limited relative lateral movement between them.

With this arrangement, when the seating unit is converted between its two configurations all the seat parts and all the armrests except one end armrest, which may be fixed in an aircraft, are moved laterally with respect to that one end armrest. Thus in each configuration each seat backrest can be more or less centrally located between the armrests defining the seat and in the wider configuration the two intermediate armrests between adjacent seats may be spaced apart so that sharing or armrests is clearly unnecessary. Conversely, the intermediate armrests may be close together in the narrow configuration so that they occupy a minimal part of the width of the unit. Indeed, they are preferably in contact with each other in that configuration.

Each lost-motion device preferably comprises a rod or like elongated member secured to a part of one of two components between which lost motion is provided, passing freely through a bore in an adjacent part of the other component of the two and having on the side of the adjacent part remote from the part to which it is secured a head or attached nut or other enlargement which will not pass through the bore, the head, nut or enlargement being spaced from the said side of the adjacent part a distance equal to the desired lost motion. However, other types of lost-motion device such as a flexible connecting member between the parts or an elongated ring-like link surrounding the parts may equally be used. Its essential function is to permit one of two parts which are in contact to move away from the other a pre-determined distance and then to connect the parts together so that further movement of the said one part will also move the other part. Likewise, when the parts are spaced apart the said pre-determined distance it is to permit the said one part to be moved towards the other until contact between them is re-established, after which further movement of the said one part in the same direction will also move the other or, if one of the other part is fixed no further movement of the said one part will be possible.

Further according to this invention, an aircraft passenger seating unit providing seats for two passengers abreast separated by intermediate armrests which is convertible to provide different widths of seats by moving a part of one seat laterally with respect to a part of the other seat between two positions is characterized in that there are two intermediate armrests between the seats which are capable of relative lateral movement between a closely spaced relationship and a more widely spaced relationship and in that automatic means are included for moving the intermediate armrests to their more widely spaced relationship when the said part of one seat is moved to its position providing wider seats and for permitting them to move to their closely spaced relationship when the said part is moved to its position providing narrower seats.

Still further according to the invention, an aircraft passenger seating unit providing seats for more than two passengers abreast separated by intermediate armrests which is convertible to provide different widths of seats by moving a part of one end seat laterally with respect to a part of the other end seat between two positions is characterized by a pair of intermediate armrests separating each two adjacent seats, the intermediate armrests of each said pair being capable of relative lateral movement between a closely spaced relationship and a more widely spaced relationship, and by automatic means for moving the intermediate armrests to their more widely spaced relationship when the said part of one end seat is moved relative to the said part of the other end seat to its position providing wider seats and for permitting them to move to their more closely spaced relationship when the said part is moved to its position providing narrower seats.

BRIEF DESCRIPTION OF THE DRAWINGS

An embodiment of the invention is illustrated by way of example by the accompanying drawings in which.

BEST MODE OF CARRYING OUT THE INVENTION

Figure 1:
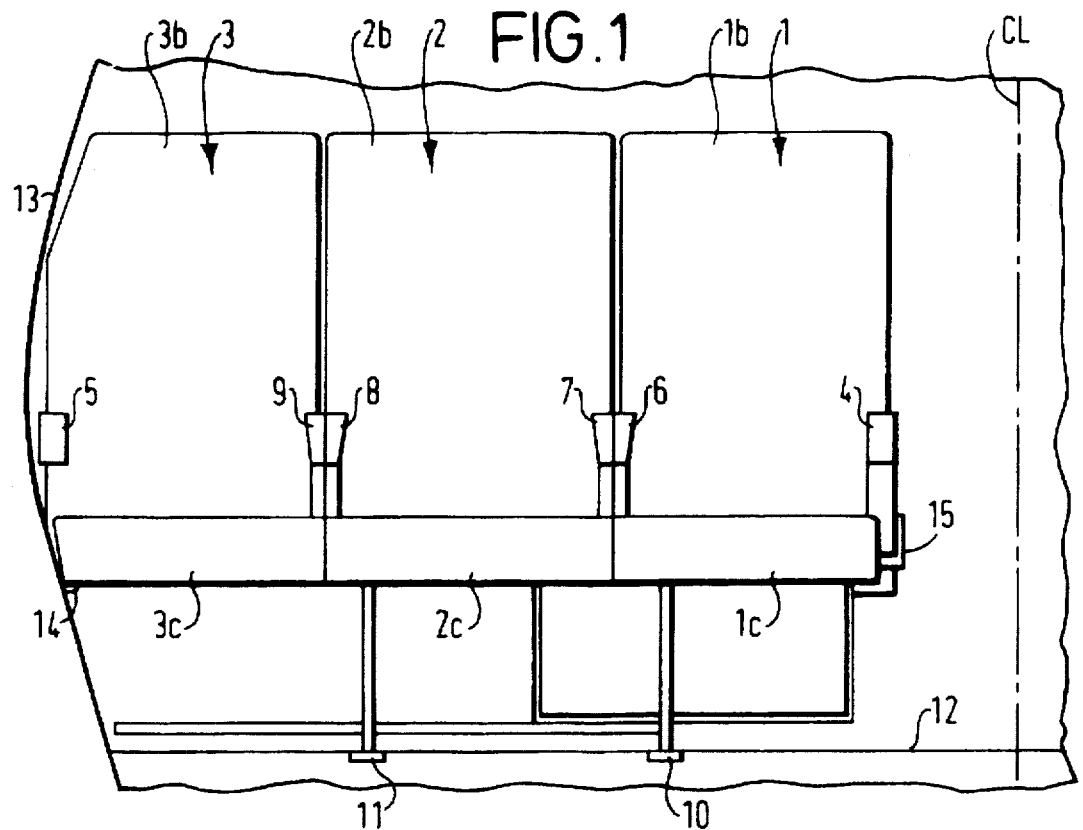
FIG. 1 is a diagrammatic cross-sectional view of part of a passenger aircraft cabin, looking towards the rear, showing a seating unit which provides three seats abreast, the unit being in the configuration providing narrower seats.
Figure 2:
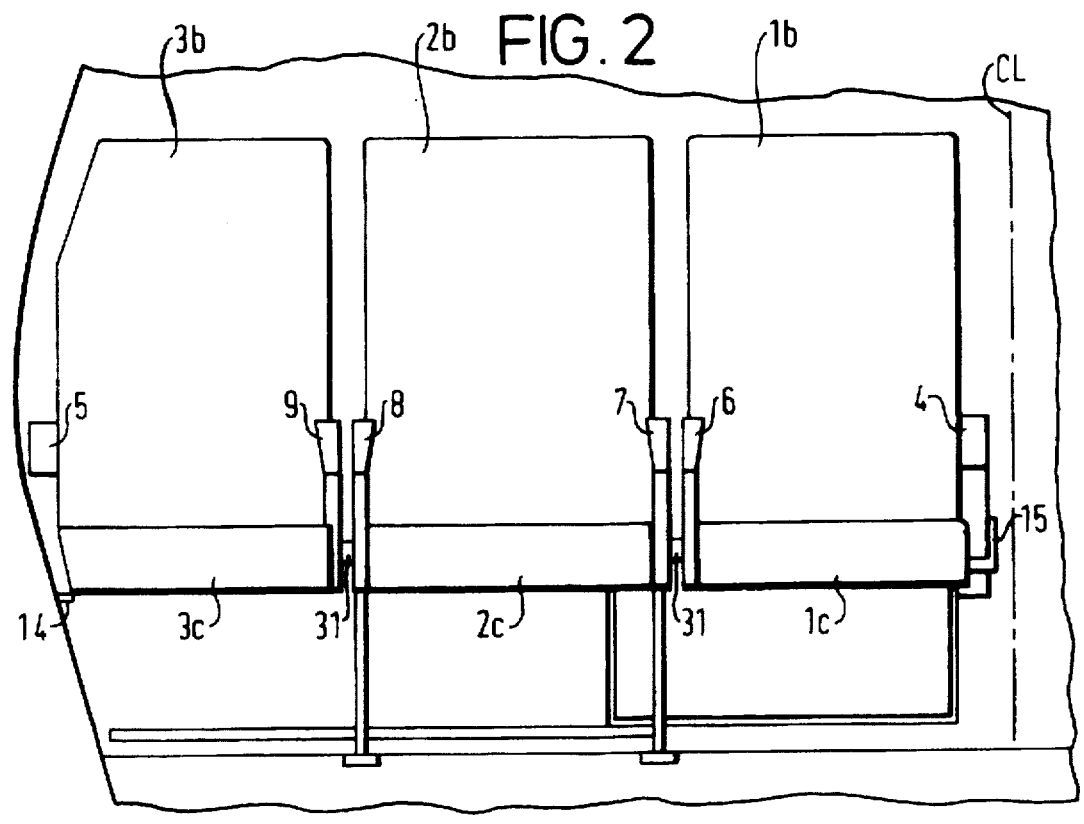
FIG. 2 is a similar view showing the seating unit converted to provide three wider seats abreast.
Figure 3:
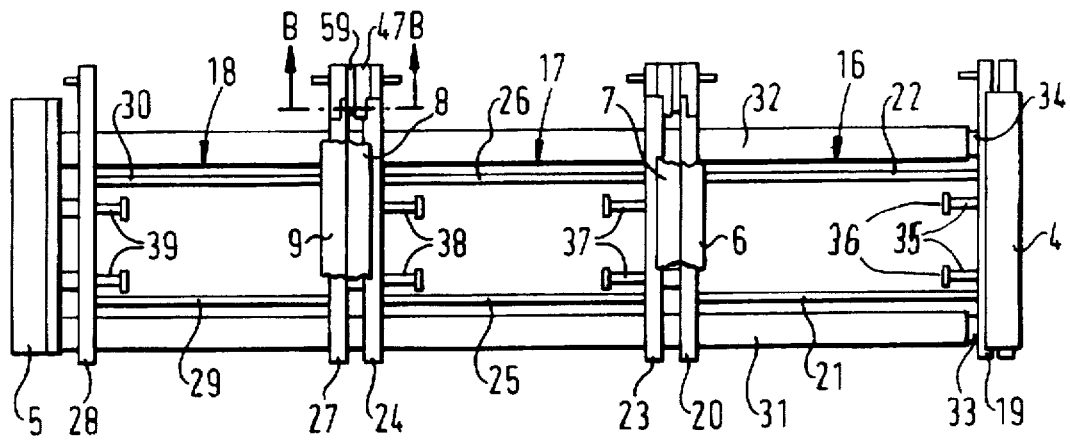
FIG. 3 is a plan of the seat cushion support frame of the seating unit shown in FIGS. 1 and 2 in the configuration providing three narrower seats.
Figure 4:
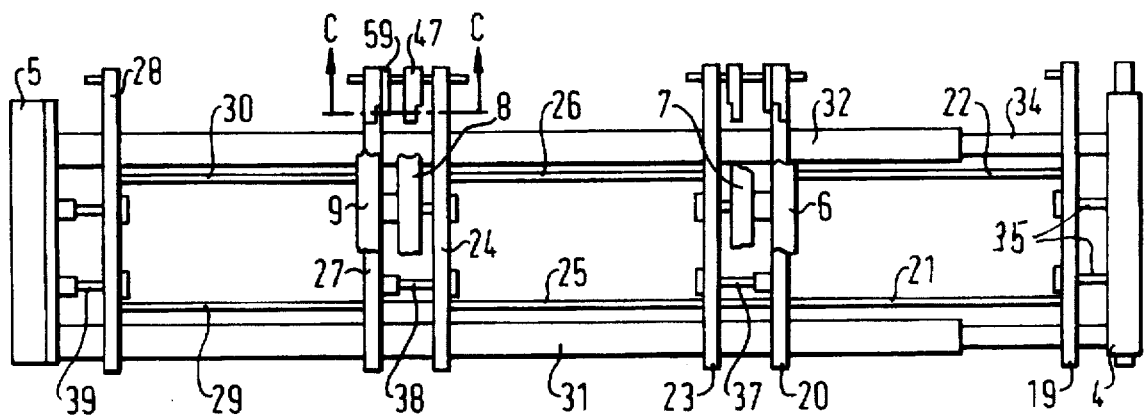
FIG. 4 is a view similar to FIG. 3 showing the unit in the configuration providing three wider seats.

FIGS. 1 and 2 show a little more than half the width of the aircraft cabin, the centre-line CL of which is shown in chain-dotted lines. The right hand seating unit shown provides seats 1, 2, 3 for three passengers abreast with end armrests 4, 5 and two intermediate armrests between adjacent seats. Intermediate armrests 6 and 7 are between seats 1 and 2 and intermediate armrests 8 and 9 are between seats 2 and 3. The seating unit is constructed on a support frame which is illustrated in FIGS. 3 and 4 and will be described in detail with reference to those figures. The seat frame is secured in conventional manner to anchoring tracks 10 and 11 which extend longitudinally along the floor 12 of the aircraft. The seat frame is extendible towards the centre-line of the aircraft so that the three seats may be made wider. Apart from the pairs of intermediate armrests 6, 7 and 8, 9 this is is similar to what has been disclosed in the above-mentioned U.S. Pat. No. 5,131,607 and as described in that Specification there may be in the left hand side of the cabin a seating unit which can either be extended laterally to provide three seats abreast of width similar to those shown in FIG. 1 or be retracted to provide two wider seats of width similar to those shown in FIG. 2. Thus the two seating units can either provide six narrower seats abreast, say for "Tourist" class passengers, with a narrow aisle between them which is more or less central in the cabin or five wider seats, say for "Business" class passengers, with a wider aisle between them which is offset to the left of the cabin. Such arrangements are known and described inter alia in the said U.S. Specification so the left hand seating unit will not be described further.

End armrest 4 is on the aisle end of the unit and end armrest 5 is adjacent to the wall 13 of the aircraft cabin and is fixed to it by a bracket 14. In the narrower configuration shown in FIG. 1, the seat cushions 1c, 2c and 3c and the seat backrests 1b, 2b and 3b are close together and the intermediate armrests of each pair are in contact so as to occupy as little of the width of the unit as possible. Typically the width between the armrests defining each seat is of the order of 16½ to 17 inches (approximately 420 to 430 mm.). In the wider configuration, shown in FIG. 2, the seat cushions and backrests and the intermediate armrests of each pair are spaced apart and the width between the armrests defining each seat is increased to 19 or 20 inches (approximately 480 mm.). The conversion is all performed by a single action of pulling on the handle 15 on the aisle end armrests 4 after releasing locking means (not shown) which holds the parts in either configuration. Releasing may be performed by the same action, as described in U.S. Pat. No. 5,131,607. Conversion back to the narrower configuration is a simple matter of pushing on the handle or the aisle end armrest 4 after releasing the locking means.

The seat cushion support frame shown in FIG. 3 comprises three frame parts 16, 17 and 18 for supporting the three seats 1, 2, 3. The aisle end frame part 16 comprises two side sections 19, 20 joined by two tie rods 21, 22. Middle frame part 17 comprises two side sections 23, 24 joined by two tie rods 25, 26 and the wall end frame part 18 comprises two side sections 27, 28 joined by two tie rods 29, 30. The side sections of the frame parts 16 and 7 and the inner side section 20 of the aisle side frame part 16 are all slidably mounted on a pair of parallel tubes 31, 32 which are carried by the frame shown in FIGS. 1 and 2 which is secured to the aircraft floor 12 by the tracks 10 and 11. The aisle side end armrest 4 is secured to two tubes 33, 34 which are a sliding fit in the tubes 31, 32 so that the armrest may be moved laterally towards the aisle. The aisle side section 19 of the aisle side frame part 16 is slidable on the tubes 33, 34 so that the frame part 16 may be moved laterally towards the aisle with respect to the tubes 31, 32.

Aisle end armrest 4 is connected to the aisle side section 19 of aisle side frame part 16 by a lost-motion device comprising a pair of headed rods 35 passing slidably through bores in the section 19 and secured to the armrest. When the armrest 4 is moved towards the aisle, the rods 35 first slide through the section 19 until their heads 36 abut against the side of the section, when further movement carries the section 19 and thus the whole of the frame part 16 towards the aisle. The length of the rods 35 determines the extent of the lost-motion of the armrest 4 before movement of the frame part 16 commences and may be adjustable, for example by screwing the rods into the armrest.

Figure 5:
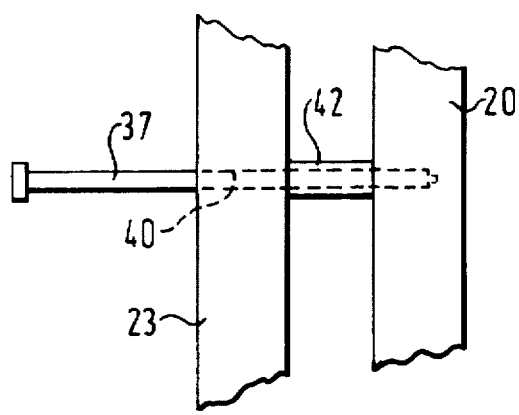
FIG. 5 shows a detail of FIG. 3 to a larger scale.

Aisle side frame part 16 is similarly connected to the middle frame part 17 by a lost-motion device comprising headed rods 37 secured to section 20 and passing through bores in side sections 23, middle frame part 17 is connected to the wall side frame part 18 by a lost-motion device comprising headed rods 38 secured to section 27 and passing through bores in section 24 and the wall side frame part 18 is connected to the wall side end armrest 5 by headed rods 39 secured to the armrest and passing through bores in the section 28. Thus by pulling on the aisle side end armrest 4 the three frame parts are all moved towards the aisle in a growing chain-like action. The action is reversed if the aisle side end armrest 4 is then pushed towards the wall 13, of the aircraft, the rods successively sliding through the bores until spacers on the rods make contact with walls surrounding the ends of the bores. This is shown to a larger scale in FIG. 5, which shows detail of a rod 37 having a head 40 which passes through a bore 41 in the section 23 of the middle frame part 17 and is screwed into the section 20 of the aisle side frame part 16. A spacer 42 on the rod determines the minimum spacing between the sections 20 and 21, in the narrower configuration of the seating unit, and the legth of the rod determines the maximum spacing between them, in the wider configuration of the unit. This is all quite similar to what is described in U.S. Pat. No. 5,131,607 excepting for the movement of the end armrest 4 relative to the frame part 16 and the movement of the frame part 18 relative to the end armrest 5.

Parts of the intermediate armrests 6, 7, 8 and 9 are included in FIGS. 3 and 4 to show their location in relation to the frame parts 16 to 18. The armrests 6 and 9 are mounted on upward extensions of the rear ends of the sections 20 and 27 of the frame parts 16 and 18 and the armrests 7 and 8 are mounted on support members which are mounted between the adjacent sections 20 and 23 and 24 and 27. Details are shown to a larger scale in FIGS. 6 and 7 which show the mounting of the armrests 8 and 9. The mounting of the armrests 6 and 7 is exactly the same but in mirror-image.

Intermediate armrest 9 is pivotally mounted on the section 27 of frame part 18 by a pin 43 and moves laterally with the frame part. The adjacent section 24 of the middle frame part 17 is connected to the section 27 by a pair of guide rods 44 which are secured in bores in the section 24 by grub screws 45 and are received slidably in bushes 46 mounted in bores in the section 27. Thus when the section 24 moves laterally away from the section 27 as previously described the rods 44 slide in the bushes 46. An armrest support member 47 is slidably mounted on the rods 44 and the armrest 8 is pivotally mounted on the support member by a pin 48. The support member 47 is partially hollow and is connected to the section 24 by a lost-motion device comprising a rod 49 passing through bores in the section 24 and one wall 50 of the hollow part 51 of the support member. It is connected to the section 27 by a lost-motion device comprising a rod 52 passing through bores in the section 24 and the other wall 53 of the hollow part 51. The rods 49 and 52 have heads 54, 55 which are accommodated in recesses 56, 57 in the sections 24 and 27 respectively and circlips 58 which are larger than the bores in the walls of the hollow part 51 are fitted to the ends of the rods within the hollow part to prevent them being withdrawn from it. A spacer 59 is clamped to the section 27 by studs and nuts 60 to limit the movement of the support member 47 towards the section 27.

Figure 6:
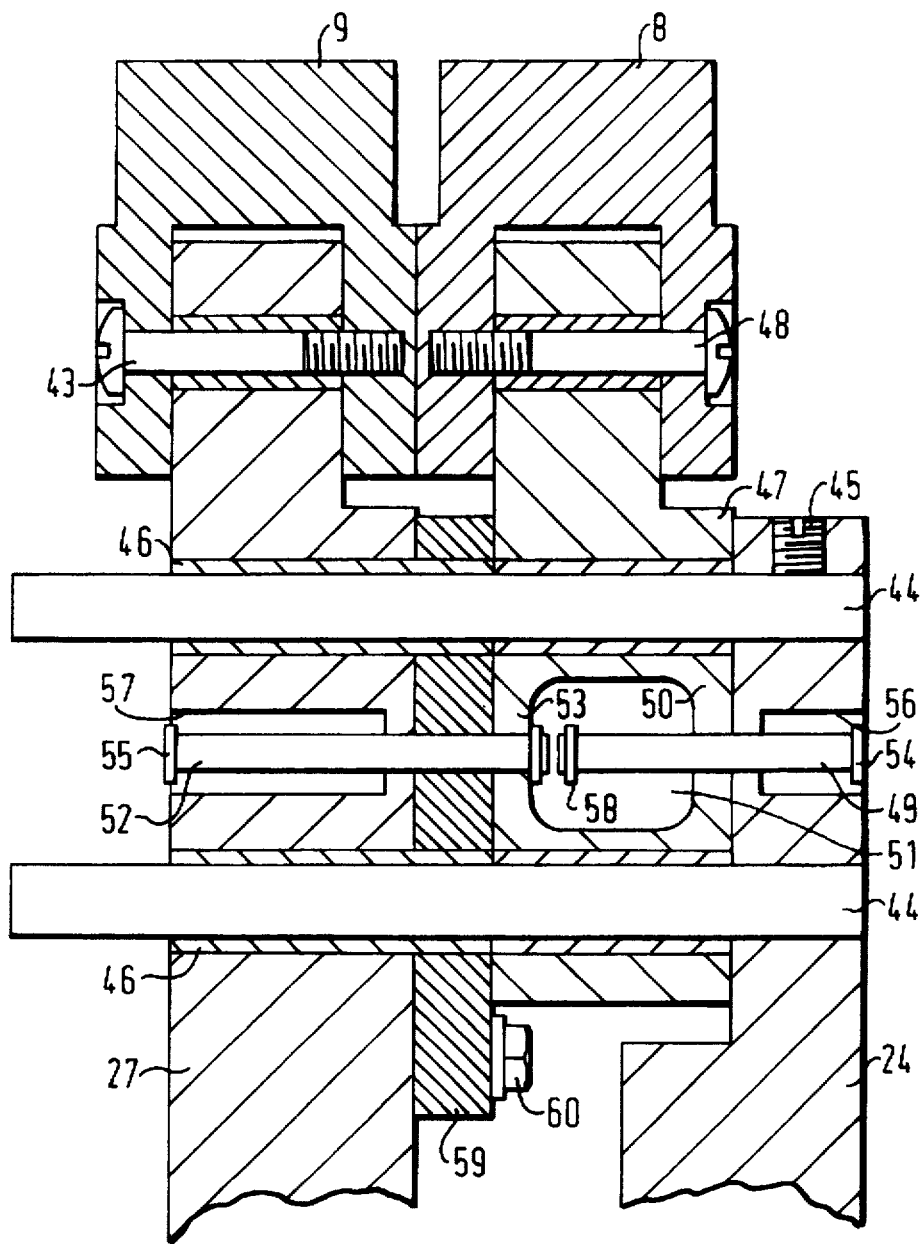
FIG. 6 is a section on the line B—B of FIG. 3, drawn to a larger scale.
Figure 7:
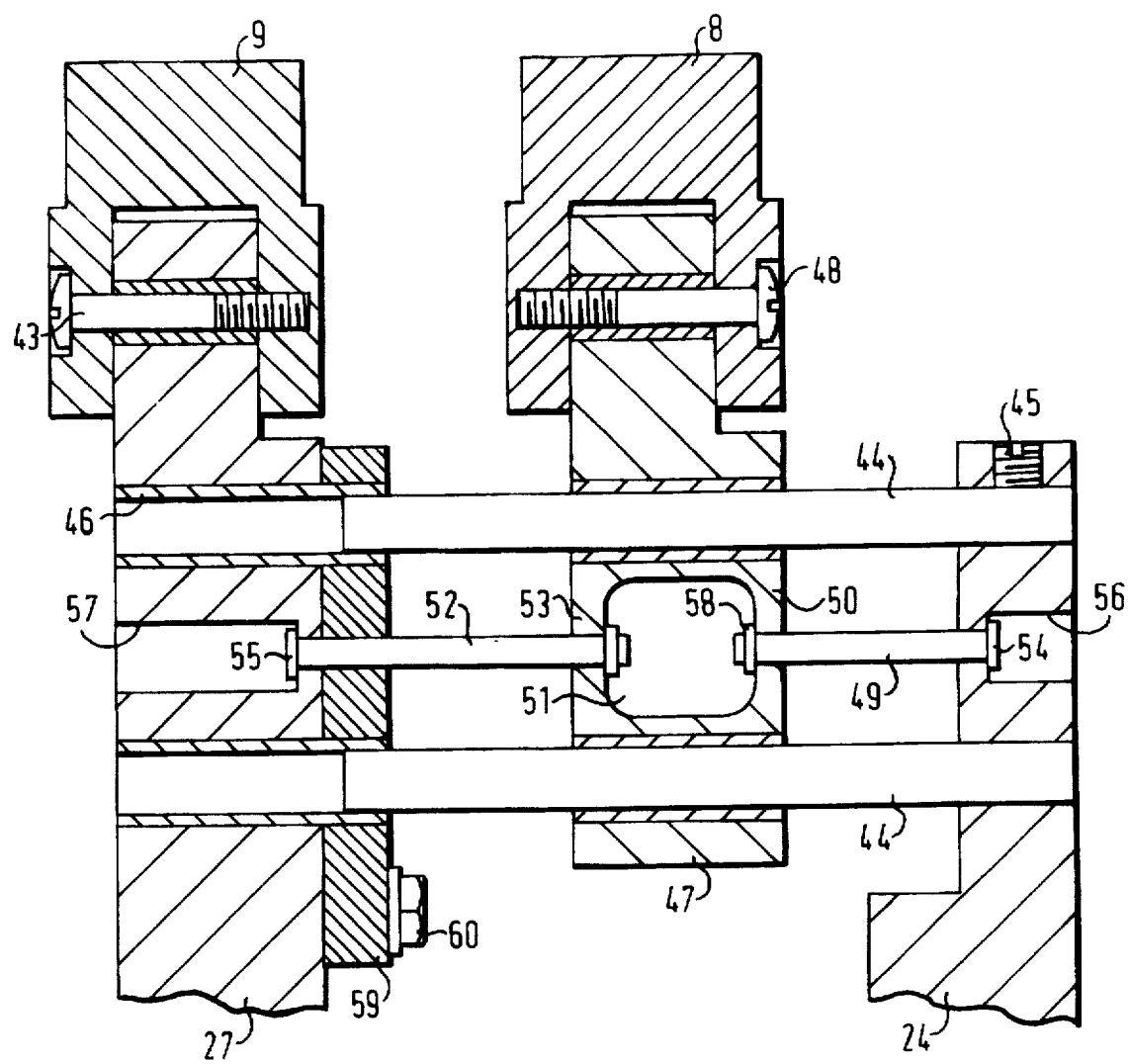
FIG. 7 is a section on the line C—C of FIG. 4, drawn to a larger scale.

FIG. 6 shows the intermediate armrests 8 and 9 and associated parts in their relationship in the narrower configuration of the seating unit and FIG. 7 shows them in their relationship in the wider configuration. From the position shown in FIG. 6, as the middle frame part 16 moves laterally away from the frame part 17, the section 24 moves away from the section 27, the rods 44 sliding in the bushes 46 as described above. At the same time, the rod 49 slides in the bores in the section 24 and the wall 50 of the hollow part 51 of the support member 47, permitting the section 24 to move away from the support member until the head 54 of the rod abuts the base of the recess 56 and the circlip 58 abuts the wall 50. On further movement of the section 24 away from the section 27, the support member 47 and the intermediate armrest 8 are moved bodily with the section 24 and the rod 52 is drawn through the bore in the section 27 until the head 55 abuts against the base of the recess 57, which must coincide with the abutment of the heads of the rods 38 with the side of the section 24. The parts are then in the relationship shown in FIG. 7, corresponding to the wider configuration of the seating unit, with the armrest 8 spaced laterally from both the armrest 9 and the section 24.

In converting the unit back to its narrower configuration, by pushing on the handle 15 and/or the aisle end armrest towards the inboard end of the unit, the rods of the various lost motion devices slide back in their respective bores, starting with the rods 35 and continuing in sequence from aisle end to inboard end. In each case the rod slides until the parts connected by it make contact and the part one the aisle side then pushes the other towards the inboard end. In the case of the intermediate armrests 8 and 9, from the positions shown in FIG. 7 the side section 24 is moved towards the support member 47 after the side member supporting aisle side armrest 4 has contacted the side section 19 and the spacers 42 on the rods 37 have contacted the side section 23. The rod 49 slides in the bores in the side member 24 and the support member 47 until those two components make contact as shown in FIG. 6, then the support member 47 and the armrest 8 are moved towards the inboard end of the unit. The rod 52 slides in the bores in the side section 27 and the spacer 59 until the support member 47 contacts the spacer and the side section 24 of the middle frame part 17 contacts the spacers 42 on the rods 38. The two intermediate armrests 8 and 9 are then close together as in FIG. 6. Further movement of the handle 15 and/or aisle end armrest towards the inboard end of the unit causes the inboard frame part 18 to move towards the inboard armrest, sliding over the rods 39 until the movement is completed when the side section 28 contacts the spacers on the rods 39. The unit is then in the narrower configuration shown in FIGS. 3 and 6.

Whilst the embodiment described and illustrated by the drawings is a unit providing seats for three passengers, the invention is equally applicable to units providing two seats and to units providing more than three seats. Referring to FIGS. 3 and 4, it may be seen that a two-seat unit could be constructed by shortening the tubes 31, 32, discarding the side sections 20 and 23 and associated armrest components and tie rods 25 and 26 and connecting the tie rods 21 and 22 directly to side section 24. Likewise, a unit providing more than three seats could be constructed by increasing the length of the tubes 31, 32 and adding one or more complex middle frame parts 17 between the side sections 20 and 23.

INDUSTRIAL APPLICATION

Setting units embodying the invention are useful in any passenger-carrying aircraft which is designed to carry more than a small number, say five or six, of passengers. The invention provides convertible seating units which provide improved comfort for passengers than previously-known units. The invention includes the fitting of such seating units in an aircraft and an aircraft having such seating units fitted.

I claim:

1. An aircraft passenger seating unit providing seats (1, 2, 3) for two or more passengers abreast which is convertible to provide different widths of seats by moving seat parts laterally with respect to one another between two configurations, in which the seats are defined by an end armrest (4, 5) at each end of the unit and intermediate armrests (6, 7, 8, 9) between the or each pair of adjacent seats, characterized in that there is a pair of intermediate armrests (6–7, 8–9) between the or each pair (1–2, 2–3) of adjacent seats and in that the end armrests (4, 5 and one of the or each pair of intermediate armrests (6–7, 8–9) are each connected to the adjacent seat part (19, 23, 24, 28) by a lost-motion device (35, 49, 39), the said lost-motion devices permitting, when the seating unit is being converted between the two configurations, limited relative lateral movement between each of the said armrests and the said adjacent seat part and the intermediate armrests of the or each said pair are connected to each other by another lost-motion device (52) permitting limited relative lateral movement between them.

2. An aircraft passenger seating unit as claimed in claim 1 providing three seats abreast characterized in that the said one of each pair of intermediate armrests (7, 8) is connected by a lost-motion device (49) to a part (24) of the middle seat.

3. An aircraft passenger seating unit as claimed in claim 1 wherein each lost-motion device comprises an elongated member secured to one of the two components connected by it, passing freely through a bore in the other component connected by it and having on a side of the other component remote from the component to which it is secured a head while will not pass through the bore, the head or enlargement being spaced from the said side a distance equal to the desired lost motion.

4. An aircraft having fitted therein an aircraft passenger seating unit as claimed in claim 1.

5. An aircraft passenger seating unit providing seats for two passengers abreast separated by intermediate armrests which is convertible to provide different widths of seats by moving a part of one seat laterally with respect to a part of another seat between two positions is characterized in that there are two intermediate armrests (8, 9) between the said seats (1, 3) which are capable of relative lateral movement between a closely spaced relationship and a more widely spaced relationship and in that automatic means are included for moving the intermediate armrests to their more widely spaced relationship when the said part of one seat is moved to its position providing wider seats and for permitting them to move to their closely spaced relationship when the said part is moved to its position providing narrower seats.

6. An aircraft seating unit as claimed in claimed in claim 5, wherein the automatic means comprises lost-motion devices (49,52) connecting one of the or each pair of intermediate armrests respectively to a part of an adjacent seat and to the other intermediate armrest of the pair.

7. An aircraft passenger seating unit as claimed in claim 6 wherein each lost-motion device comprises an elongated member secured to one of the two components connected by it, passing freely through a bore in the other component connected by it and having on a side of the other component remote from the component to which it is secured a head which will not pass through the bore, the head or enlargement being spaced from the said side a distance equal to the desired lost motion.

8. An aircraft passenger seating unit providing seats for more than two passengers abreast separated by intermediate armrests which is convertible to provide different widths of seats by moving a part (15) of one end seat (1) laterally with respect to a part (5) of the other end seat (3) between two positions is characterized by a pair of intermediate armrests (6–7, 8–9) separating each two adjacent seats, the intermediate armrests of each said pair being capable of relative lateral movement between a closely spaced relationship and a more widely spaced relationship, and by automatic means for moving the intermediate armrests to their more widely spaced relationship when the said part of one end seat is moved relative to the said part of the other end seat to its position providing wider seats and for permitting them to move to their more closely spaced relationship when the said part is moved to its position providing narrower seats.

9. An aircraft passenger seating unit as claimed in claim 8 wherein the automatic means comprises lost-motion devices (49, 52) connecting one of the or each pair of intermediate armrests respectively to a part of an adjacent seat and to the other intermediate armrest of the pair.

10. An aircraft passenger seating unit as claimed in claim 9 wherein each lost-motion device comprises an elongated member secured to one of the two components connected by it, passing freely through a bore in the other component connected by it and having on a side of the other component remote from the component to which it is secured a head which will not pass through the bore, the head or enlargement being spaced from the said side a distance equal to the desired lost motion.

* * * * *